United States Patent
Seo et al.

(10) Patent No.: US 11,987,247 B2
(45) Date of Patent: May 21, 2024

(54) SCENARIO-BASED MOTION PLANNING AND CONTROL FOR COASTING

(71) Applicant: PlusAI, Inc., Cupertino, CA (US)

(72) Inventors: Hyoungju Seo, Cupertino, CA (US); Chaozhe He, Clarence Center, NY (US); Xiaoyu Huang, San Jose, CA (US); Lichun Yang, Cupertino, CA (US); Robert Joseph Dingli, Cupertino, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/844,637

(22) Filed: Jun. 20, 2022

(65) Prior Publication Data
US 2023/0406309 A1  Dec. 21, 2023

(51) Int. Cl.
*B60W 30/18* (2012.01)
*B60W 30/16* (2020.01)
*B60W 40/04* (2006.01)
*B60W 40/076* (2012.01)
*B60W 40/10* (2012.01)
*B60W 60/00* (2020.01)

(52) U.S. Cl.
CPC ...... *B60W 30/18072* (2013.01); *B60W 30/16* (2013.01); *B60W 40/04* (2013.01); *B60W 40/076* (2013.01); *B60W 40/1005* (2013.01); *B60W 60/0015* (2020.02); *B60W 2300/12* (2013.01); *B60W 2300/145* (2013.01); *B60W 2510/0647* (2013.01); *B60W 2520/105* (2013.01); *B60W 2530/16* (2013.01); *B60W 2552/15* (2020.02); *B60W 2554/80* (2020.02); *B60W 2555/20* (2020.02)

(58) Field of Classification Search
CPC ................................................. B60W 30/18072
See application file for complete search history.

(56) References Cited

U.S. PATENT DOCUMENTS

| | | | |
|---|---|---|---|
| 2018/0149212 A1* | 5/2018 | Huh | B60W 10/08 |
| 2019/0186561 A1* | 6/2019 | Follen | F16D 48/06 |
| 2019/0257415 A1* | 8/2019 | Kook | F16H 61/0213 |
| 2020/0180633 A1* | 6/2020 | Wu | B60W 30/18163 |
| 2022/0185333 A1* | 6/2022 | Smith | B60W 10/11 |

* cited by examiner

*Primary Examiner* — Imran K Mustafa
(74) *Attorney, Agent, or Firm* — Sheppard Mullin Richter & Hampton LLP

(57) ABSTRACT

Methods, systems, and non-transitory computer-readable media estimate coasting behavior of a vehicle; identify a scenario associated with coasting in an environment of the vehicle; and based in part on the coasting behavior, generate a trajectory associated with coasting for the vehicle to move in the scenario.

20 Claims, 9 Drawing Sheets

500

```
For obs in merging obstacles:
    risk_level = f(obs_pose, ego_pose, merge_zone_info)
    if risk_level == "No":
        react NO
    else if risk_level == "intermediate":
        react Coasting
    else if risk_level == "high":
        react Throttle / Brake with proper following distance
```

SCENARIO-BASED MOTION PLANNING AND CONTROL FOR COASTING

FIELD OF THE INVENTION

The present technology relates to autonomous systems. More particularly, the present technology relates to vehicle coasting based on scenarios.

BACKGROUND

The motion of vehicles in which autonomous systems are implemented can be controlled in various ways. With the engine and the transmission engaged, the application of throttle can cause a vehicle to increase speed. The application of brake can cause a vehicle to decrease speed. The motion of a vehicle can be characterized as coasting when zero throttle and zero brake are commanded.

SUMMARY

Various embodiments of the present technology can include methods, systems, and non-transitory computer readable media configured to perform operations comprising: estimating coasting behavior of a vehicle; identifying a scenario associated with coasting in an environment of the vehicle; and based in part on the coasting behavior, generating a trajectory associated with coasting for the vehicle to move in the scenario.

In some embodiments, the coasting behavior is associated with coasting acceleration.

In some embodiments, the coasting acceleration is based on parameters comprising at least one of rolling resistance, road grade, wind force, and engine power train resistance.

In some embodiments, the operations further comprise: based on the trajectory, generating control signals to control the vehicle; and providing the control signals to actuator subsystems of the vehicle to perform coasting by the vehicle.

In some embodiments, the operations further comprise: performing a safety check on the coasting behavior; and in response to satisfaction of the safety check, utilizing the coasting behavior to generate the trajectory.

In some embodiments, the safety check comprises at least one of i) a first part associated with comparison of selected boundary values and a value of estimated coasting acceleration and ii) a second part associated with comparison of a following distance threshold value and a distance between the vehicle and another object.

In some embodiments, the scenario is associated with a type of coasting scenario relating to road grade.

In some embodiments, the scenario is associated with a type of coasting scenario relating to reactive or active actions to be taken by the vehicle in relation to traffic conditions.

In some embodiments, the scenario is associated with a type of coasting scenario relating to precautious vehicle measures to optimize safety.

In some embodiments, the trajectory specifies coasting for the vehicle.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

Figure 1:
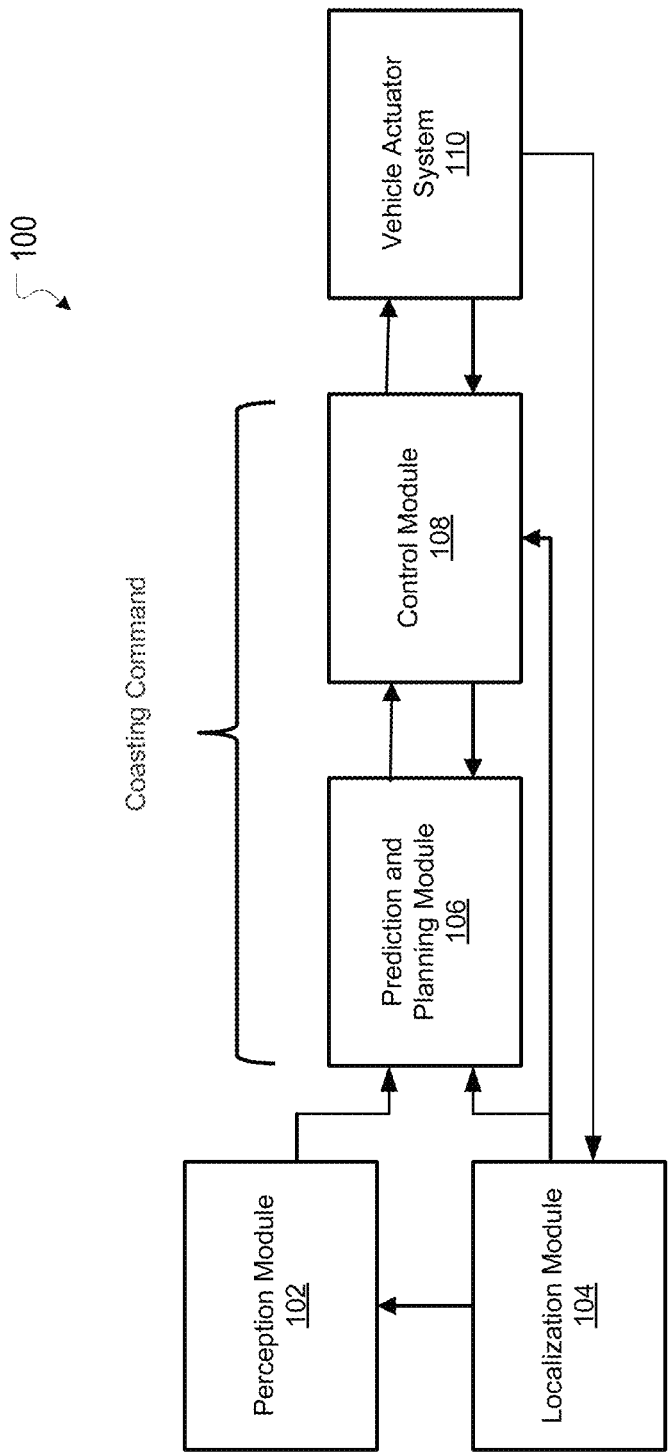
FIG. 1 illustrates an example system for coasting, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Vehicles, such as trucks, can exhibit different types of driving behavior. One type of driving behavior is coasting. Coasting can be characterized as movement of a vehicle when the engine and the transmission of the vehicle are engaged but the throttle and the brake of the vehicle are not intended to be engaged. In other words, the vehicle can be considered to be coasting under the condition of zero throttle and zero brake while the vehicle is in gear.

As a driving behavior, coasting can pose many advantages. One key advantage in coasting relates to precautious speed reduction and safety. Coasting moderates the speed of a vehicle and thus contributes to the overall safety in an environment in which the vehicle is traveling. In addition, coasting economizes on fuel consumption by the vehicle and thus realizes significant cost benefits. The cost related advantages of coasting become even more apparent as the price of fuel continues to increase. As a related cost consideration, frequent coasting reduces vehicle braking, thus moderating equipment wear and tear and related maintenance expenses. Another advantage of coasting relates to human driving. Human drivers often coast during manual vehicle operation. Thus, vehicle driving that incorporates coasting can desirably reflect human driving style. The adoption of a human driving style in vehicle operation can enhance riding comfort for persons in the vehicle. Such adoption also can contribute to road safety by the vehicle exhibiting a motion profile that is familiar to others on the road.

However, despite these and other advantages, conventional autonomous systems of vehicles often fail to consider coasting. Conventional autonomous systems can implement various planning functionality for vehicle operation. For example, conventional planning systems can perform route, behavior, and motion planning. Notwithstanding their capabilities, conventional planning systems are limited in their abilities to address a full array of potential vehicle behavior. In particular, conventional planning systems are unable to adequately incorporate vehicle coasting into their planning functionality. As a result, the significant advantages associated with vehicle coasting remain unrealized in conventional autonomous systems of vehicles.

The present technology provides improved approaches to vehicle coasting that overcome disadvantages of conventional techniques. Scenarios in which vehicle coasting can be performed are actively identified to increase utilization of vehicle coasting. In various embodiments of the present technology, an autonomous system of a vehicle, such as a truck, can command coasting for the vehicle in various scenarios. A control module of the autonomous system can generate estimated coasting behavior based on various parameters. The estimated coasting behavior can be provided to a planning module of the autonomous system. The planning module can analyze an environment in which the vehicle is traveling. When a scenario associated with coasting is identified, the planning module can generate a planned trajectory for the vehicle that indicates that motion of the vehicle is to be generated as a coasting action. The planning module can generate the planned trajectory based on the estimated coasting behavior. The planned trajectory can be provided to the control module. The control module can thereafter execute coasting as commanded. The planning module and the control module can perform a safety check before planning and executing coasting, as discussed in more detail herein.

Vehicle coasting in accordance with the present technology achieves significant advantages in relation to safety, economy, and comfort. Increased utilization of vehicle coasting in accordance with the present technology generally moderates vehicle speed and avoids sudden changes to vehicle speed, thereby bolstering road safety. In view of escalating fuel prices, more frequent use of vehicle coasting by the present technology can significantly reduce vehicle operating expense. The present technology further economizes on vehicle operating expenses by reducing burden on, for example, vehicle braking subsystems and thereby moderating related maintenance or replacement costs. In addition, increased utilization of vehicle coasting enabled by the present technology mimics human-style driving and thus boosts comfort for persons in the vehicle as well as safety by exhibiting driving behavior that is familiar to other vehicles. These and other inventive features and related advantages of the various embodiments of the present technology are discussed in more detail herein.

FIG. 1 illustrates an example system 100 including a perception module 102, a localization module 104, a prediction and planning module 106, a control module 108, and a vehicle actuator system 110, according to some embodiments of the present technology. In some embodiments, the system 100 can be an autonomous system, or a portion thereof, implemented in or by any type of vehicle, such as an autonomous vehicle.

In some embodiments, some or all of the functionality performed by the system 100 may be performed by one or more computing systems implemented in a vehicle. In some embodiments, some or all of the functionality performed by the system 100 may be performed by one or more backend computing systems. In some embodiments, some or all of the functionality performed by the system 100 may be performed by one or more computing systems associated with (e.g., carried by) one or more users riding in a vehicle.

In some embodiments, some or all data processed and/or stored by the system 100 can be stored in a data store (e.g., local to the system 100) or other storage system (e.g., cloud storage remote from the system 100). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the system 100 can be implemented in any suitable combinations.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The functionality of the perception module 102, the localization module 104, the prediction and planning module 106, the control module 108, and the vehicle actuator system 110 of the system 100 are described in brief for purposes of illustration. The perception module 102 can receive and analyze various types of data about an environment in which a vehicle (ego vehicle) is located. Through analysis of the various types of data, the perception module 102 can perceive the environment of the vehicle and provide the vehicle with critical information so that navigation of the vehicle is safe and effective. For example, the perception module 102 can determine the pose, trajectories, size, shape, and type of objects (or obstacles) in the environment of the vehicle. Various models, such as machine learning models, can be utilized in such determinations.

The various types of data received by the perception module 102 can be any data that is supportive of the functionality and operation of the present technology. For example, the data can include attributes of the vehicle, such as location, speed, acceleration, weight, and height of the vehicle. As another example, the data can include data relating to topographical features in the environment of the vehicle, such as traffic lights, road signs, lane markers, landmarks, buildings, structures, trees, curbs, bodies of water, and the like, etc. As yet another example, the data can include attributes of dynamic objects in the surroundings of the vehicle, such as location, speed, acceleration, size, type, and movement of vehicles, persons, animals, road hazards, etc. Further still, the data can include various other contextual or environmental data, such as time, weather, road characteristics, relevant news about the environment, etc. Many variations are possible.

Sensors can be utilized to capture some types of the data. The sensors can include, for example, cameras, radar, LiDAR (light detection and ranging), GPS, IMUs (inertial measurement units), and sonar. Other types of sensors also can be utilized. The sensors can be appropriately positioned at various locations (e.g., front, back, sides, top, bottom) on the vehicle to optimize the collection of data. Data also can be captured by sensors that are not mounted on the vehicle (ego vehicle), such as data captured by another vehicle (e.g., another truck) or by non-vehicular sensors located in the environment of the vehicle.

The localization module 104 can determine the pose of the vehicle. Pose of the vehicle can be determined in relation to a map of an environment in which the vehicle is traveling. Based on data received by the vehicle, the localization module 104 can detect features in the environment of the vehicle and determine distances and directions of the features. The localization module 104 can compare detected features with features in a map (e.g., HD map) to determine the pose of the vehicle in relation to the map. The features in the map can include, for example, traffic lights, crosswalks, road signs, lanes, road connections, stop lines, etc. The localization module 104 can allow the vehicle to determine its location in real time with a high level of precision that supports safe navigation of the vehicle through an environment.

The prediction and planning module 106 can make decisions to navigate the vehicle from a start location to a destination location. The prediction and planning module 106 can generate a route plan reflecting high level objectives, such as selection of different roads to travel from the start location to the destination location. The prediction and planning module 106 can generate a behavioral plan with more local focus that accounts for various factors (e.g., road smoothness, velocity profiles, traffic information, etc.) to choose safe, executable behavior of the vehicle. The prediction and planning module 106 can generate a motion plan for the vehicle that navigates the vehicle in relation to the predicted location and movement of other objects (or obstacles) so that collisions and other undesirable interactions can be avoided. The prediction and planning module 106 can perform its planning operations subject to certain constraints or objectives. The constraints or objectives can be, for example, to ensure safety, to minimize costs, and to enhance comfortability. Based on its planning, the prediction and planning module 106 can provide a planned trajectory (or profile) to the control module 108.

A behavioral plan reflected in the planned trajectory can include various behavioral actions to be selectively performed by the vehicle. In accordance with the present technology, behavioral actions can include, for example, coasting by the vehicle. Coasting by the vehicle can be characterized by the application of zero throttle and zero brake while the vehicle is in gear. Decisions by the prediction and planning module 106 to perform coasting can realize significant benefits relating to vehicle safety, economy, and comfort, as described. Accordingly, the prediction and planning module 106 can actively identify the occurrence of scenarios in which coasting by the vehicle is appropriate so that coasting can be fully incorporated in planned vehicle motion. When a scenario associated with coasting is identified, the prediction and planning module 106 can analyze relevant factors, such as estimated coasting behavior, of the vehicle to determine whether coasting would be appropriate in the scenario. For example, the prediction and planning module 106 can perform a safety check in relation to a preferred following distance threshold, as discussed in more detail herein. If coasting is determined to be appropriate in the scenario, the prediction and planning module 106 can incorporate coasting in planning of vehicle motion in the scenario. Accordingly, based on the estimated coasting behavior, the planned trajectory can describe the motion of the vehicle as if the vehicle is actually coasting. The planned trajectory can command that vehicle motion be generated through coasting.

Based on the planned trajectory from the prediction and planning module 106, the control module 108 can generate control signals to implement planned coasting by the vehicle. The control module 108 can provide the control signals as commands to the vehicle actuator system 110 to generate the desired coasting. The vehicle actuator system 110 can be associated with various functions of the vehicle, such as braking, acceleration, steering, etc. In addition, the control module 108 can generate estimated coasting behavior of the vehicle as if the vehicle was coasting. The estimated coasting behavior can be assessed through a safety check performed by the control module 108. The estimated coasting behavior and results of the safety check can be provided by the control module 108 to the prediction and planning module 106. The prediction and planning module 106 and the control module 108, which perform primary functions in relation to planning and execution of vehicle coasting, are discussed in more detail herein.

Figure 2:
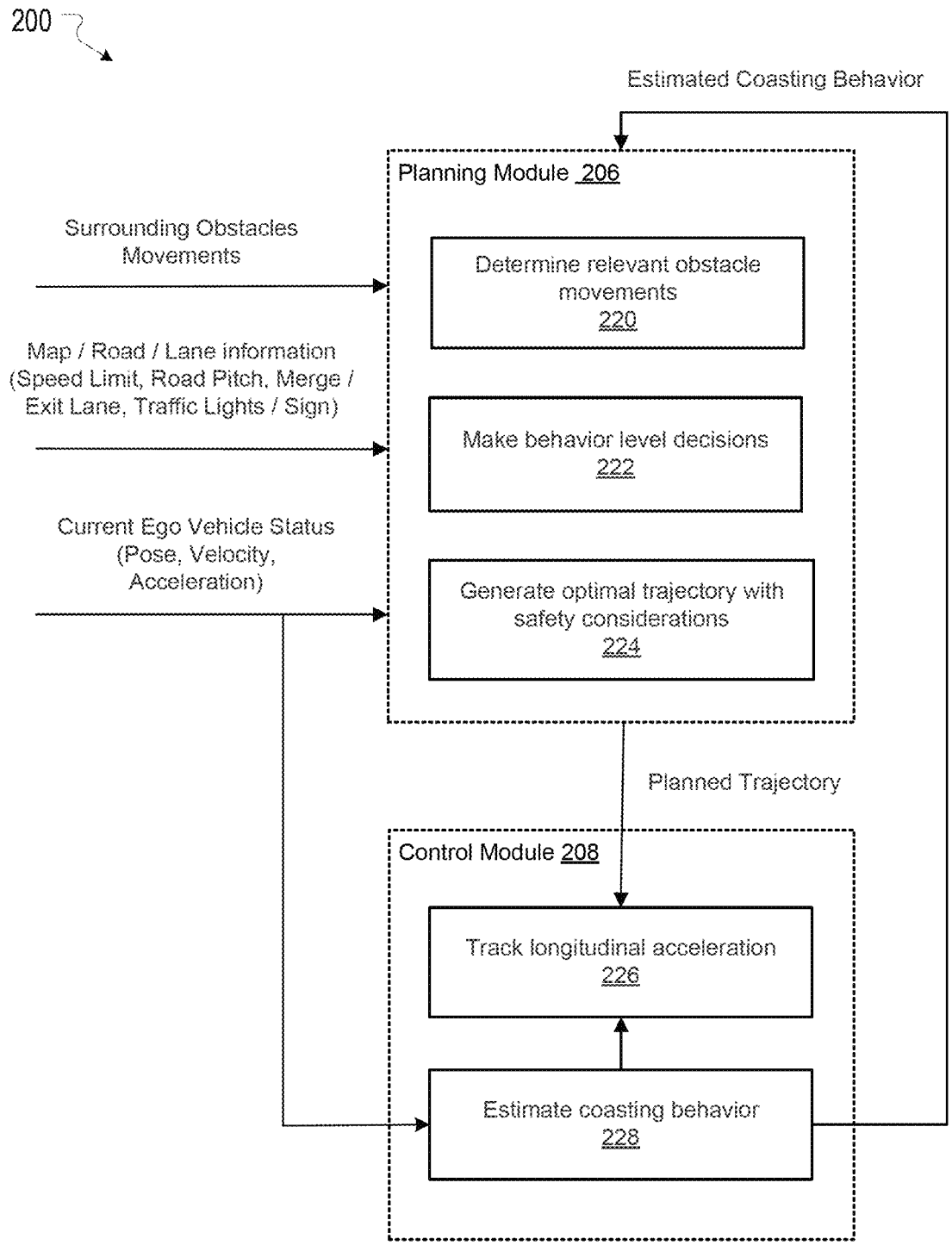
FIG. 2 illustrates an example system including a planning module and a control module, according to embodiments of the present technology.

FIG. 2 illustrates an example system 200 including a planning module 206 and a control module 208, according to some embodiments of the present technology. In some embodiments, relevant functions of the prediction and planning module 106 and the control module 108 of FIG. 1 can be implemented by, respectively, the planning module 206 and the control module 208. The planning module 206 can generate a planned trajectory for a vehicle (ego vehicle). The planned trajectory for the vehicle can be generated at any suitable frequency. The generation of the planned trajectory can be based in part on various types of data that are received by a perception function (e.g., the perception module 102). At block 220, the planning module 206 can determine movement and relevance of objects (or obstacles) in an environment of a vehicle. This determination of relevance can be based on information about the objects and their movements. For example, the planning module 206 can determine the current position, velocity, and acceleration of objects in the environment of the vehicle, as well as their predicted trajectories.

Based on such information, the planning module 206 can rate the objects in connection with their relevance to the vehicle. In this regard, the rating of the objects can be based on, for example, an algorithmic rating system. The rating system can generate ratings reflecting predicted likelihoods that the objects will encounter (e.g., approach, collide with) the vehicle or otherwise take undesirable action in relation to the vehicle. As just one example, an object that is predicted to collide with the vehicle can have a relatively high rating while another object that is predicted to move in a direction away from the vehicle can have a relatively low rating. Objects having a rating that satisfies a threshold rating value can be considered in planning by the planning module 206.

At block 222, the planning module 206 can make behavior level decisions. The behavior level decisions can be associated with desired behavior of the vehicle while traveling in the environment. The behavioral level decisions can be based on various types of information, such as map information, road information, and lane information. In particular, such information can include, for example, speed limit, road pitch, merge lane, exit lane, traffic lights, traffic signs, etc. Based on this information and information relating to objects in the environment of the vehicle that have been determined to be relevant, the planning module 206 can make decisions to select appropriate behavioral actions to navigate the vehicle. Behavioral actions can include, for example, lane following, lane changing, merging, nudging, and, importantly, coasting. Coasting is discussed in more detail herein. In various instances, the behavioral actions can be planned individually or in suitable combinations. For example, in one situation, one type of behavioral action can be planned. In another situation, a first type of behavioral action and a second behavioral action can be planned together.

To select coasting as a planned behavioral action, the planning module 206 can identify the occurrence of scenarios in the environment of the vehicle in which vehicle coasting would be suitable. The planning module 206 can plan coasting by the vehicle during occurrence of such scenarios. The scenarios associated with coasting can include any situations, events, phenomena, or conditions in which vehicle coasting would be appropriate, optimal, preferred over behavioral actions, or otherwise desirable.

Figure 3:
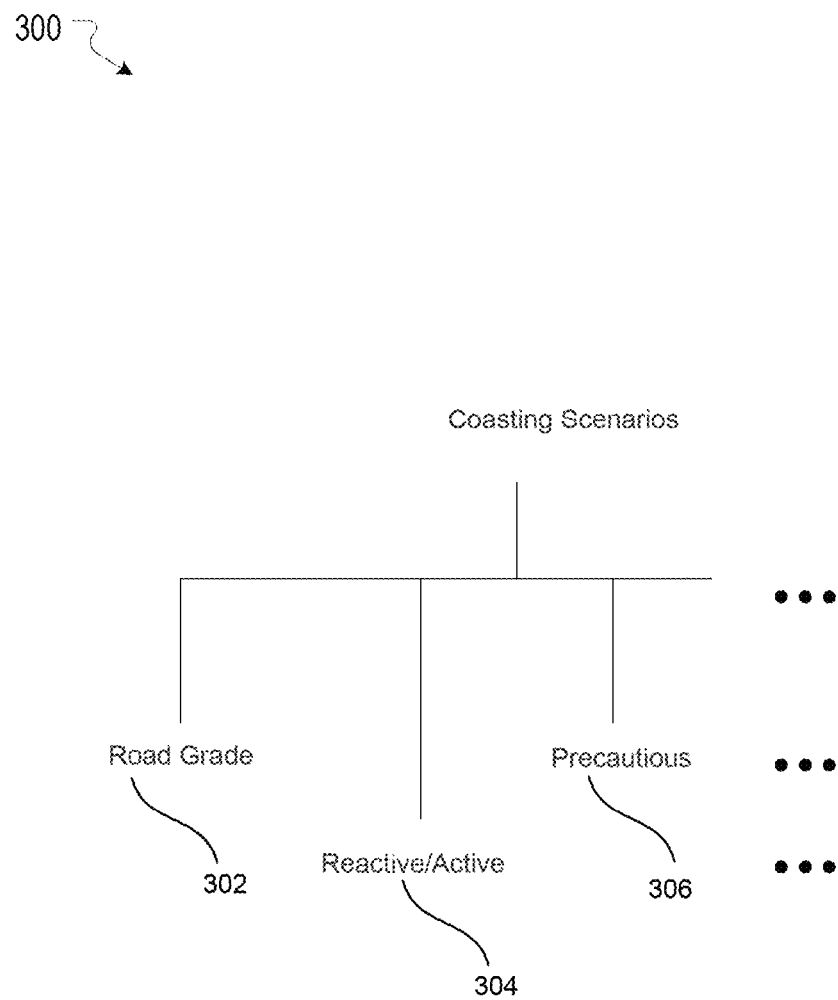
FIG. 3 illustrates an example classification of coasting scenario types, according to embodiments of the present technology.

The scenarios associated with coasting can be classified into various scenario types. FIG. 3 illustrates an example classification 300 of coasting scenarios based on scenario types, according to some embodiments of the present technology. The classification 300 can include a first type of coasting scenario 302 that is associated with road grade. The first type of coasting scenario can include various scenarios. A first example scenario of the first type of coasting scenario 304 can be associated with a flat or substantially flat road grade. A second example scenario of the first type of coasting scenario 302 can be associated with a slight road grade, such as a downhill road grade. In the second example scenario, a slight road grade can be a road grade having a grade value that falls within a selected range of road grade values. The selected range of road grade values can be any suitable range of road grade values that is appropriate for coasting in a particular navigation context.

The classification 300 also can include a second type of coasting scenario 304 that is associated with reactive or active actions taken by a vehicle in relation to traffic conditions. The second type of coasting scenario 304 can include various scenarios. A first example scenario of the second type of coasting scenario 304 can be associated with a vehicle (ego vehicle) traveling in an lane (ego lane) into which other vehicles are merging. A second example scenario of the second type of coasting scenario 304 can be associated with cut-in and cut-out. Cut-in can involve another vehicle abruptly moving into a lane (ego lane) of a vehicle (ego vehicle) while not maintaining a safe distance from the vehicle. Cut-out can involve the other vehicle leaving the lane. A third example scenario of the second type of coasting scenario 304 can be associated with vehicles in stop and go conditions in heavy traffic.

The classification 300 also can include a third type of coasting scenario 306 associated with precautious vehicle measures to optimize safety. The third type of coasting scenario 306 can include various scenarios. A first example scenario of the third type of coasting scenario 306 can be associated with a vehicle (ego vehicle) performing a nudge in relation to laterally intrusive obstacles on the road. The nudge can involve the vehicle approaching or passing to the left or right of the obstacle. A second example scenario of the third type of coasting scenario 306 can be associated with vehicles slowing down in neighbor lanes adjacent to a lane (ego lane) of a vehicle (ego vehicle) or in exit lanes. A third example scenario of the third type of coasting scenario 306 can be associated with road agents or objects (or obstacles) that are indicative of vehicle transitions from high speed to low speed. For example, the occurrence of brake lights, traffic lights, and traffic signs can be indicative of such speed transitions.

The types of coasting scenarios and associated example scenarios discussed herein are merely examples. Other types of coasting scenarios and other associated example scenarios can be identified in accordance with the present technology. As just one example, another type of coasting scenario (not shown) can be associated with a state or condition of a vehicle. In this regard, an example scenario of this type of coasting scenario can involve a determination that fuel levels of a vehicle have reached a predetermined low level (e.g., a certain fraction of a fuel tank). Another example scenario of this type of coasting scenario can involve a determination that a braking system of a vehicle has reached a certain state of usage or repair. Further, another type of coasting scenario (not shown) can be associated with increasing speed. In this type of coasting scenario, coasting by the vehicle can increase the speed of the vehicle, which stands in contrast to the types of coasting scenarios otherwise discussed herein involving slowing down of the vehicle. An example scenario of the type of coasting scenario associated with increasing speed can involve traffic conditions (e.g., stop and go traffic) in which a stopped vehicle in traffic can be commanded to perform coasting so that the vehicle can proceed from a stop and cautiously move forward as traffic conditions allow. The aforementioned types of coasting scenarios and associated example scenarios are merely illustrative. Any types of scenarios and example scenarios thereof that are suitable for coasting are possible in accordance with the present technology.

In FIG. 2, the planning module 206 can be configured to actively prefer and incorporate coasting for the vehicle as warranted by relevant contextual factors. When the planning module 206 identifies a scenario associated with coasting in the environment of the vehicle, the planning module 206 can determine whether coasting is appropriate. The planning module 206 can predict motion of the vehicle based on an estimated coasting behavior of the vehicle that is generated by the control module 208, as discussed in more detail herein. Based on the predicted motion of the vehicle, the planning module 206 can determine whether coasting by the vehicle would result in safe, effective navigation with respect to the identified scenario.

In some embodiments, the planning module 206 can perform a safety check associated with a preferred following distance threshold. The preferred following distance threshold can be any suitable value of distance between the vehicle and one or more other moving objects or obstacles (e.g., other vehicles) ahead of the vehicle to avoid collisions or other undesirable interactions. As part of the safety check, the planning module 206 can perform calculations to determine whether motion of the vehicle based on the estimated coasting behavior will satisfy the preferred following distance threshold. The preferred following distance threshold can be determined based on various data, such as the velocities and accelerations of the vehicle and the other objects in the environment ahead of the vehicle. Satisfaction of the preferred following distance threshold can indicate that the predicted motion of the vehicle based on the estimated coasting acceleration value will maintain a sufficient distance from the other objects. Accordingly, satisfaction of the preferred following distance threshold can be an indicator that predicted motion of the vehicle is potentially safe. Non-satisfaction of the preferred following distance threshold can indicate that the predicted motion of the vehicle based on the estimated coasting acceleration value will not maintain sufficient distance from the other objects. Accordingly, non-satisfaction of the preferred following distance threshold can be an indicator that predicted motion of the vehicle is potentially not safe.

If it is determined that coasting by the vehicle would result in safe navigation with respect to the identified scenario, at block 224, the planning module 206 can generate a planned trajectory for the vehicle that specifies coasting. The planned trajectory can be based in part on current vehicle status, such as the current pose, velocity, and acceleration of the vehicle. The planned trajectory can indicate that the motion of the vehicle is to be generated as a coasting action. The planning module 206 can provide the planned trajectory to the control module 208. When it is determined that coasting by the vehicle would not result in safe, effective navigation with respect to an identified scenario, the planning module 206 generates a planned trajectory that does not specify coasting or specifies no coasting.

The control module 208 can receive the planned trajectory from the planning module 206. At block 226, based on the planned trajectory, the control module 208 can generate control signals to cause the vehicle to navigate based on the planned trajectory. The control module 208 can provide the control signals to actuator subsystems of the vehicle to carry out the planned trajectory. Based on the control signals, the actuator subsystems can be selectively engaged and controlled. When the planned trajectory indicates that motion of the vehicle is to be executed through coasting, the control signals can cause the actuator subsystems to not engage brakes (zero brake) and to not engage throttle (zero throttle) of the vehicle.

At block 228, the control module 208 also can generate estimated coasting behavior of the vehicle based on current ego vehicle status. The estimated coasting behavior can be generated at any suitable frequency. In some embodiments, the estimated coasting behavior can be based on or represented by estimated coasting acceleration (or deceleration) of the vehicle. A value of estimated coasting acceleration can describe the expected behavior that the vehicle would exhibit if the vehicle was actually coasting. The estimated coasting acceleration value can be based on a selected set of parameters. In some embodiments, the parameters on which an estimated coasting acceleration value is based can include, for example, rolling resistance, road grade (or pitch), wind force, and engine power train resistance. Values for the various parameters can be acquired in real time (or near real time) through measurement, calculations involving other parameters, or a combination of both. In some embodiments, additional or alternative parameters can be used to determine an estimated coasting acceleration value. Based on aggregation (e.g., lump sum) of the parameters, the control module 208 can determine in real time (or near real time) an estimated coasting acceleration value. The value of the parameters can be updated, and accordingly updated estimated coasting acceleration values can be calculated based on the updated parameter values.

The control module 208 can perform a safety check on the estimated coasting acceleration value. Because the control module 208 can have superior access to data regarding vehicle status in comparison to the planning module 206, the safety check performed by the control module 208 can serve as a fail-safe or second safety margin over the safety considerations of the planning module 206. The safety check can have a selected number of parts or components. In some embodiments, the control module 208 can perform a safety check having a first part. In the first part of the safety check, the control module 208 can determine whether the estimated coasting behavior or, in particular, the estimated coasting acceleration value is authentic. The first part of the safety check can be associated with selected boundary values or a range of values in which reasonable coasting acceleration values should fall. The boundary values can be based on relevant contextual factors. When an estimated coasting acceleration value falls within associated boundary values, the estimated coasting acceleration value can be determined to be authentic. Accordingly, the first part of the safety check can be deemed satisfied. When an estimated coasting acceleration value falls outside associated boundary values, the estimated coasting acceleration value may be determined to be not authentic. Accordingly, the first part of the safety check may not be deemed satisfied. For example, the control module 208 may receive data indicating that a road segment on which a vehicle is currently traveling has an uphill grade. In this example, the boundary values for estimated coasting acceleration values can be two numbers (upper bound, lower bound) having negative values to reflect the uphill grade of the road segment. If the estimated coasting acceleration value generated by the control module 108 is a positive number, the estimated coasting acceleration value will fall outside the boundary values and be determined to be not authentic. In this example, the first part of the safety check may be deemed not satisfied. As another example, the control module 208 may receive data indicating that a road segment on which a vehicle is currently traveling has a downhill grade. In this example, the boundary values for coasting acceleration can be two numbers (upper bound, lower bound) having positive values to reflect the downhill grade of the road segment. If the estimated coasting acceleration value generated by the control module 108 is a positive number, the coasting acceleration value may fall within the boundary values and be determined to be authentic. In this example, the first part of the safety check may be deemed satisfied.

In some embodiments, the control module 208 can perform a safety check having an additional second part. The second part of the safety check performed by the control module 208 can be similar or identical to the safety check discussed above in connection with the planning module 206. In some embodiments, the control module 208 does not perform the second part of the safety check when the planning module 206 performs its safety check. In some embodiments, when the control module 208 performs a safety check having only one part (e.g., the first part), the safety check can be deemed satisfied when the one part is satisfied. In some embodiments, when the control module 208 performs a safety check having the first part and the second part, the safety check can be deemed satisfied when both of the first part of the safety check and the second part of the safety check are satisfied, or when at least one of the first part of the safety check and the second part of the safety check is satisfied. The control module 208 can provide the estimated acceleration behavior, such as the estimated coasting acceleration value, and a result of the safety check to the planning module 206.

Figure 4A:
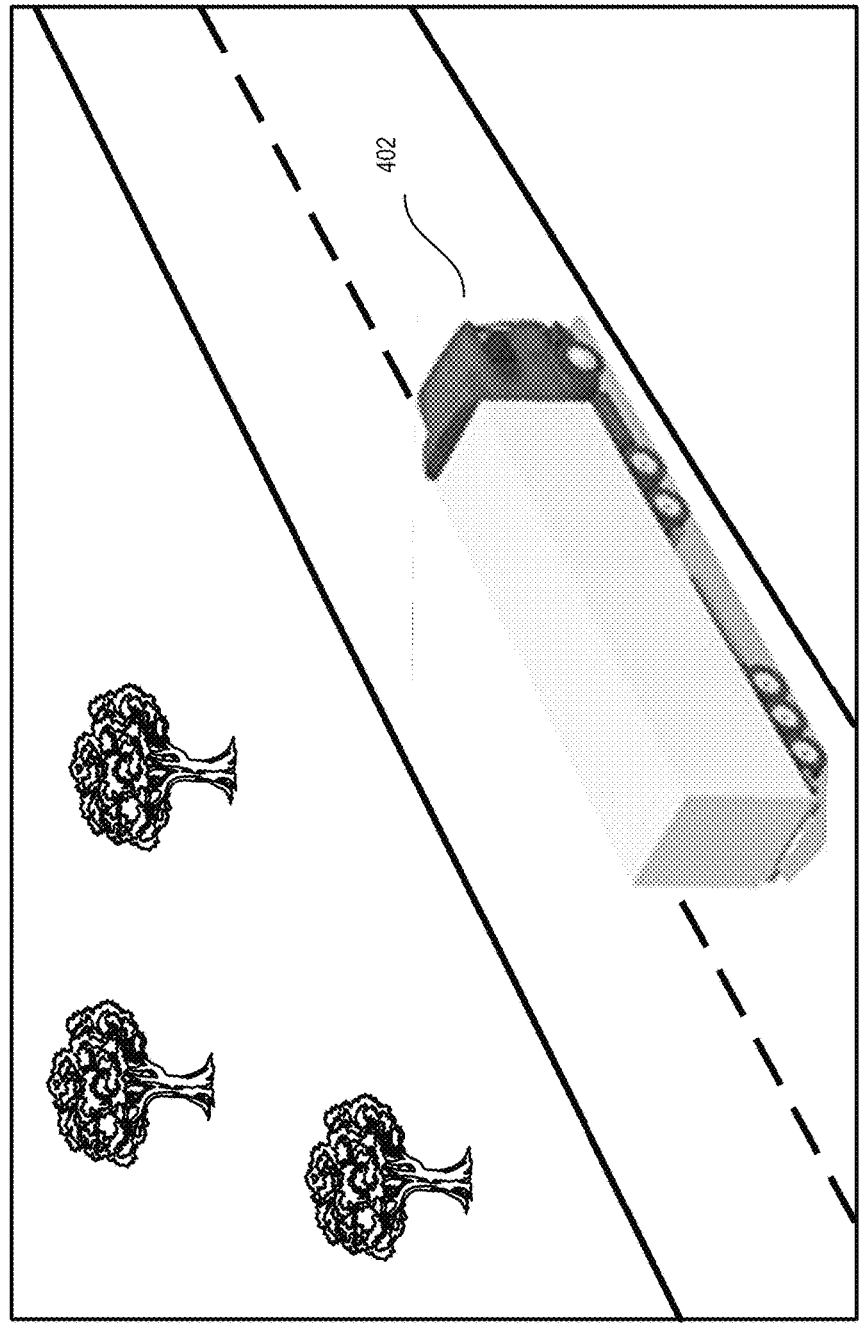
FIGS. 4A-4C illustrate example scenarios associated with coasting, according to embodiments of the present technology.
Figure 4B:
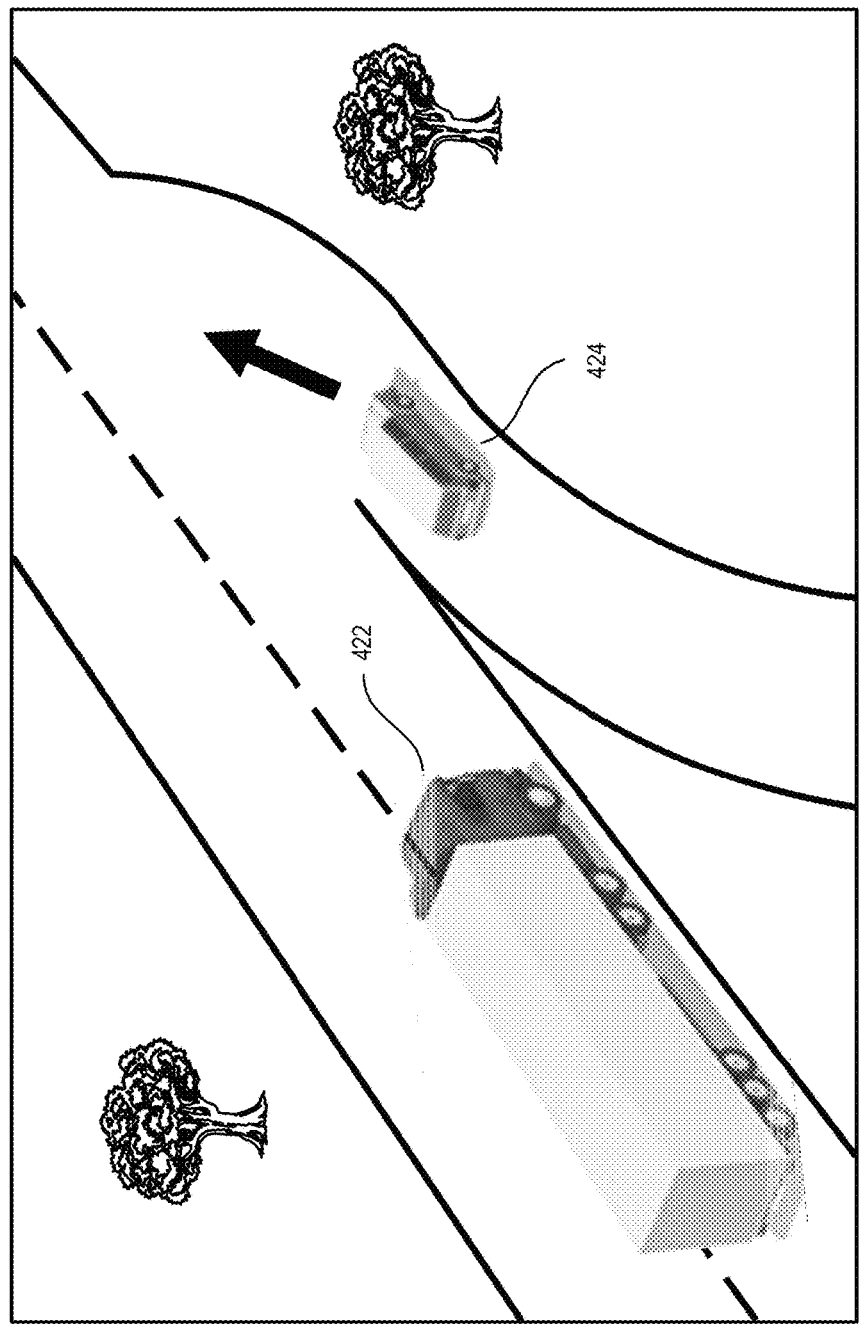
Figure 4C:
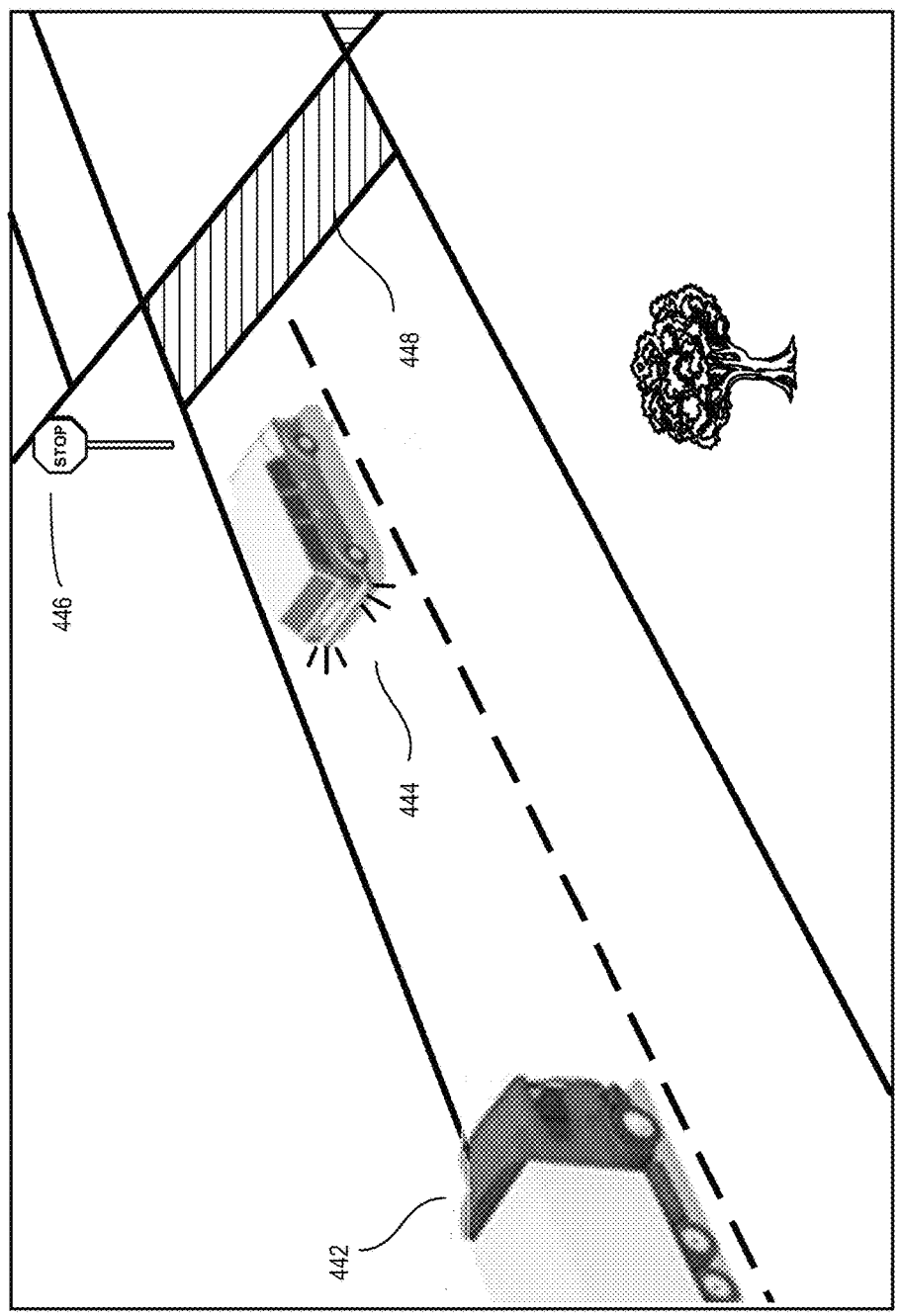

FIGS. 4A-4C illustrates example coasting scenarios, according to some embodiments of the present technology. In FIG. 4A, an example scenario 400 is illustrated. The scenario 400 involves a vehicle (or ego vehicle) 402 (i.e., a truck) traveling along a road having a modest grade that falls within a selected range of road grade values. The vehicle 402 can include an autonomous system that implements the planning module 206 and the control module 208, among other modules providing functionality for the autonomous system. Based on the occurrence of the road having the modest grade, the planning module 206 can identify the scenario 400 as potentially appropriate for coasting. The scenario 400 is an example of the first type of coasting scenario 302 associated with road grade, as discussed herein.

In FIG. 4B, an example scenario 420 is illustrated. The scenario 420 involves a vehicle (or ego vehicle) 422 (i.e., a truck) traveling along a lane on a road. The scenario 420 also involves another vehicle 424 traveling along another lane that is merging into the lane of the vehicle 422. The vehicle 422 can include an autonomous system that implements the planning module 206 and the control module 208, among other modules providing functionality for the autonomous system. Based on the occurrence of the other lane merging into the lane of the vehicle 422, the planning module 206 can identify the scenario 420 as potentially appropriate for coasting. The scenario 420 is an example of the second type of coasting scenario 304 associated with reactive or active actions taken by a vehicle in relation to traffic conditions, as discussed herein.

In FIG. 4C, an example scenario 440 is illustrated. The scenario 440 involves an environment in which a vehicle (or ego vehicle) 442 (i.e., a truck) travels along a lane on a road. The scenario 440 also involves another vehicle 444 traveling in front of the vehicle 442 in the lane of the vehicle 442. As shown, brake lights of the other vehicle 444 are turned on. The environment includes a stop sign 446 and a crosswalk 448. The vehicle 442 can include an autonomous system that implements the planning module 206 and the control module 208, among other modules providing functionality for the autonomous system. Based on the occurrence of the slowing down of the vehicle 444, as indicated by the turned on brake lights, as well as the stop sign 446 and the crosswalk 448 ahead, the planning module 206 can identify the scenario 440 as potentially appropriate for coasting. The scenario 440 is an example of the third type of coasting scenario 306 associated with precautious vehicle measures to optimize safety, as discussed herein.

Upon detection of a scenario associated with coasting in an environment of a vehicle, such as the scenario 400, the scenario 420, or the scenario 440, the planning module 206 can predict motion of the vehicle based on estimated coasting behavior, such as estimated coasting acceleration, of the vehicle. The estimated coasting behavior can be generated by the control module 208, as discussed in more detail herein. Based on the predicted motion of the vehicle, the planning module 206 can determine if vehicle coasting would be consistent with various planning related standards, such as safety considerations. When vehicle coasting is consistent with those standards, the planning module 206 can produce a planned trajectory for the vehicle that commands coasting. In turn, the control module 208, through communication of appropriate control signals, can command actuator subsystems of the vehicle to execute the commanded coasting. While certain example scenarios associated with some types of coasting scenarios are depicted in FIGS. 4A-4C, other types of coasting scenarios and other examples thereof can be identified so that coasting can be executed by the vehicle.

Figure 5:
FIG. 5 illustrates example logic to determine coasting, according to embodiments of the present technology.

FIG. 5 illustrates example logic 500 to determine whether to execute vehicle coasting, according to some embodiments of the present technology. In general, an autonomous system in accordance with the present technology can determine whether to implement vehicle coasting with respect to a scenario. Based on various data associated with the scenario and the vehicle itself, the autonomous system can calculate a value of risk in relation to the scenario. The value of risk can be indicative of a level of safety of the vehicle in navigating the scenario. In some instances, ranges of risk values can be categorized into tiers of risk. For example, a first range of risk values can be associated with a first tier of risk, a second range of risk values can be associated with a second tier of risk, and so on. In this example, each tier of risk can inform the suitability of vehicle coasting in the scenario.

For example, the logic 500 involves a scenario associated with objects (or obstacles) merging into a lane (ego lane) traveled by a vehicle (ego vehicle). A risk level for the vehicle in this scenario can be calculated as a function of various parameters. The parameters can include, for example, the poses of objects (or obstacles) in the environment of the vehicle, the pose of the vehicle, and merge zone information. The merge zone information can include data that describes various characteristics of the merge, such as length of the merge zone, type of merge (e.g., vanishing merge lane, parallel merge lane), and related information. In some embodiments, other parameters also can be considered in determination of the risk level.

If the risk level falls into a first tier of risk indicative of no (or low) risk, the vehicle can be commanded to continue on its course without coasting. If the risk level falls into a second tier of risk indicative of intermediate risk, the vehicle can be commanded to perform coasting. If the risk level falls into a third tier of risk indicative of high risk, the vehicle can be commanded to apply braking or throttle. Other examples can involve different scenarios, different functions for calculations of risk level, different parameters, and a different number of risk tiers. Many variations are possible.

Figure 6:
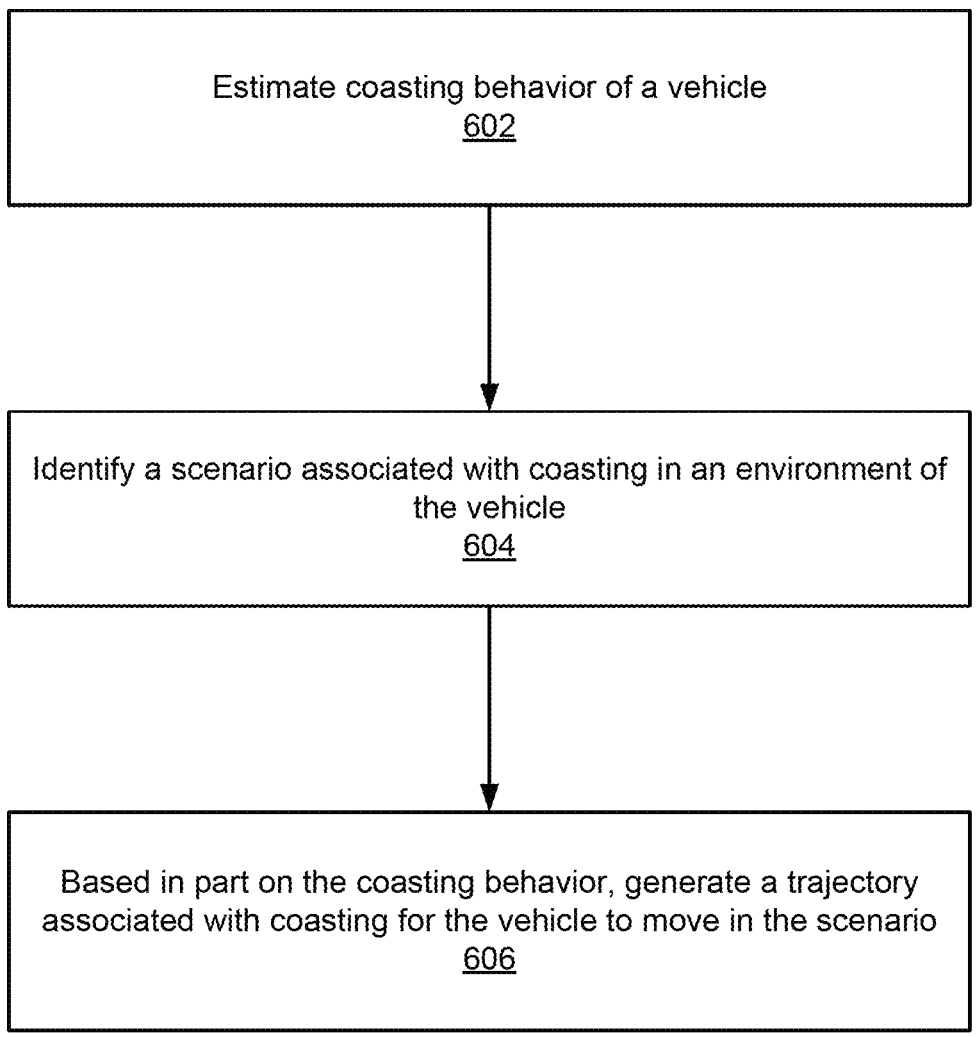
FIG. 6 illustrates an example method associated with coasting, according to embodiments of the present technology.

FIG. 6 illustrates an example method 600, according to an embodiment of the present technology. The example method 600 can be applied to various aspects of autonomous systems configured to plan coasting for vehicle navigation. At block 602, the example method 600 can estimate coasting behavior of a vehicle. At block 604, the example method 600 can identify a scenario associated with coasting in an environment of the vehicle. At block 606, the example method 600, based in part on the coasting behavior, can generate a trajectory associated with coasting for the vehicle to move in the scenario. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 7:
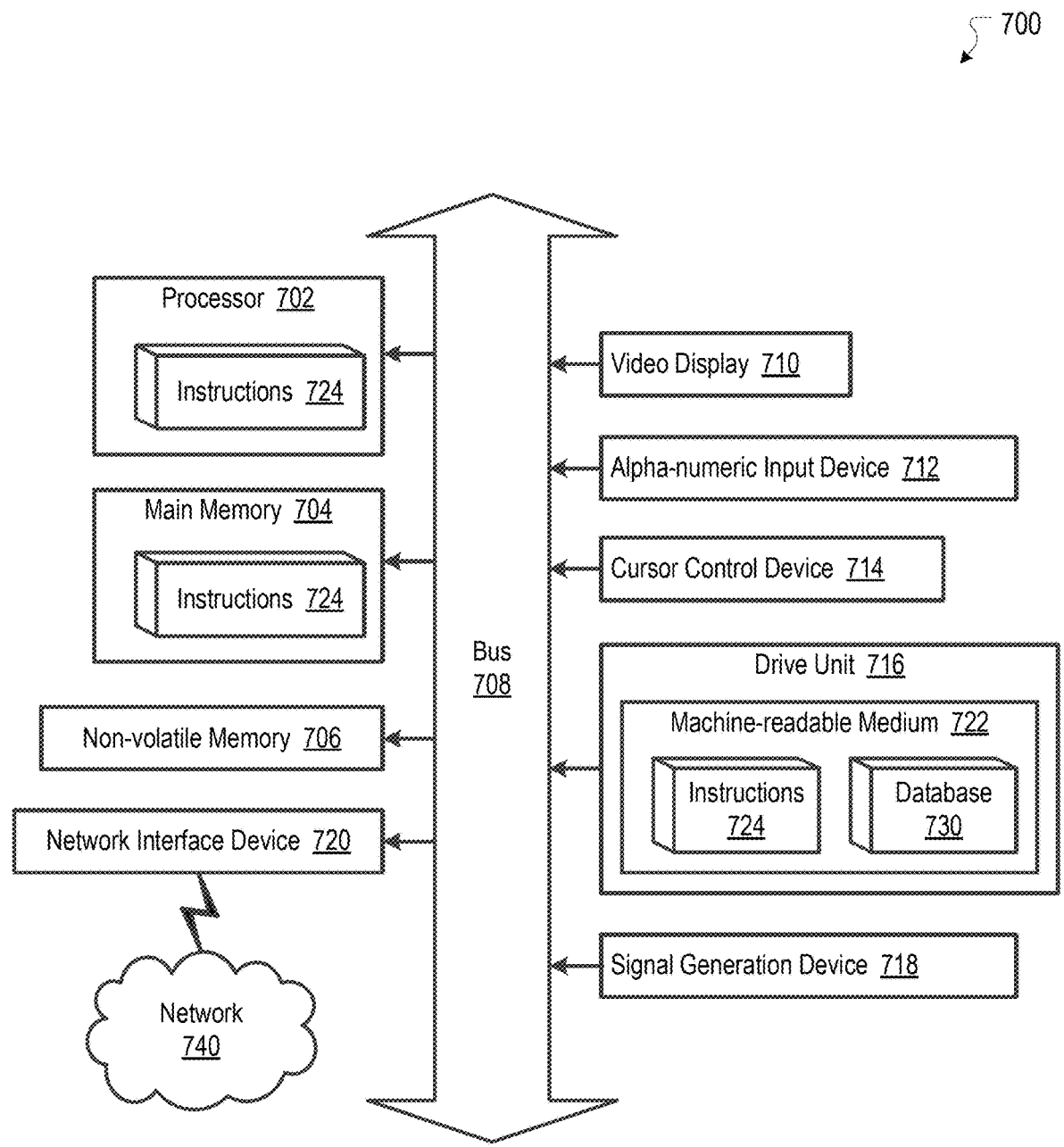
FIG. 7 illustrates an example computing system, according to embodiments of the present technology.

FIG. 7 illustrates an example of a computer system 700 that may be used to implement one or more of the embodiments of the present technology. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a drive unit 716, a signal generation device 718 (e.g., a speaker) and a network interface device 720.

In one embodiment, the video display 710 includes a touch sensitive screen for user input. In one embodiment, the touch sensitive screen is used instead of a keyboard and mouse. The disk drive unit 716 includes a machine-readable medium 722 on which is stored one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 722 also includes a database 730.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 700 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   estimating, by a computing system, coasting behavior of a vehicle;
   identifying, by the computing system, a scenario associated with coasting in an environment of the vehicle;
   based in part on the coasting behavior, generating, by the computing system, a trajectory associated with coasting for the vehicle to move in the scenario;
   performing, by the computing system, a safety check on the coasting behavior, wherein the safety check comprises a first part associated with comparison of selected boundary values of coasting acceleration and a value of estimated coasting acceleration, wherein the selected boundary values of coasting acceleration include an upper bound value and a lower bound value of coasting acceleration values reflecting a feature of the environment, and wherein the coasting is associated with application of zero throttle while the vehicle is in gear;
   providing, by the computing system, control signals to actuator subsystems of the vehicle to perform coasting by the vehicle; and
   controlling, by the computing system, the vehicle to perform coasting in the scenario based on the control signals provided to the actuator subsystems.

2. The computer-implemented method of claim 1, wherein the coasting behavior is associated with estimated coasting acceleration, the estimated coasting acceleration determined based on parameters comprising at least one of rolling resistance, road grade, wind force, and engine power train resistance.

3. The computer-implemented method of claim 1, further comprising:
   based on the trajectory, generating, by the computing system, the control signals to control the vehicle.

4. The computer-implemented method of claim 1, further comprising:
in response to satisfaction of the safety check, utilizing, by the computing system, the coasting behavior to generate the trajectory.

5. The computer-implemented method of claim 4, wherein the safety check comprises a second part associated with comparison of a following distance threshold value and a distance between the vehicle and another object.

6. The computer-implemented method of claim 1, wherein the scenario is associated with a type of coasting scenario relating to road grade.

7. The computer-implemented method of claim 1, wherein the scenario is associated with a type of coasting scenario relating to reactive or active actions to be taken by the vehicle in relation to traffic conditions.

8. The computer-implemented method of claim 1, wherein the scenario is associated with a type of coasting scenario relating to precautious vehicle measures to optimize safety.

9. The computer-implemented method of claim 1, wherein the trajectory specifies coasting for the vehicle.

10. The computer-implemented method of claim 1, wherein the selected boundary values of coasting acceleration are based on features of the environment through which the vehicle is traveling.

11. The computer-implemented method of claim 1, wherein the scenario is associated with at least one of i) the vehicle traveling in a lane into which other vehicles are merging or ii) cut-in and cut-out.

12. The computer-implemented method of claim 2, wherein the estimated coasting acceleration describes expected behavior that the vehicle would exhibit if the vehicle was actually coasting and is determined by a control module of the vehicle that can receive the trajectory from a planning module of the vehicle.

13. A system comprising:
at least one processor; and
a memory storing instructions that, when executed by the at least one processor, cause the system to perform operations comprising:
estimating coasting behavior of a vehicle;
identifying a scenario associated with coasting in an environment of the vehicle;
based in part on the coasting behavior, generating a trajectory associated with coasting for the vehicle to move in the scenario;
performing a safety check on the coasting behavior, wherein the safety check comprises a first part associated with comparison of selected boundary values of coasting acceleration and a value of estimated coasting acceleration, wherein the selected boundary values of coasting acceleration include an upper bound value and a lower bound value of coasting acceleration values reflecting a feature of the environment, and wherein the coasting is associated with application of zero throttle while the vehicle is in gear;
providing control signals to actuator subsystems of the vehicle to perform coasting by the vehicle; and
controlling the vehicle to perform coasting in the scenario based on the control signals provided to the actuator subsystems.

14. The system of claim 13, wherein the coasting behavior is associated with estimated coasting acceleration, the estimated coasting acceleration determined based on parameters comprising at least one of rolling resistance, road grade, wind force, and engine power train resistance.

15. The system of claim 13, wherein the operations further comprise:
based on the trajectory, generating control signals to control the vehicle.

16. The system of claim 13, wherein the operations further comprise:
in response to satisfaction of the safety check, utilizing the coasting behavior to generate the trajectory.

17. A non-transitory computer-readable storage medium including instructions that, when executed by at least one processor of a computing system, cause the computing system to perform operations comprising:
estimating coasting behavior of a vehicle;
identifying a scenario associated with coasting in an environment of the vehicle;
based in part on the coasting behavior, generating a trajectory associated with coasting for the vehicle to move in the scenario;
performing a safety check on the coasting behavior, wherein the safety check comprises a first part associated with comparison of selected boundary values of coasting acceleration and a value of estimated coasting acceleration, wherein the selected boundary values of coasting acceleration include an upper bound value and a lower bound value of coasting acceleration values reflecting a feature of the environment, and wherein the coasting is associated with application of zero throttle while the vehicle is in gear;
providing control signals to actuator subsystems of the vehicle to perform coasting by the vehicle; and
controlling the vehicle to perform coasting in the scenario based on the control signals provided to the actuator subsystems.

18. The non-transitory computer-readable storage medium of claim 17, wherein the coasting behavior is associated with estimated coasting acceleration, the estimated coasting acceleration determined based on parameters comprising at least one of rolling resistance, road grade, wind force, and engine power train resistance.

19. The non-transitory computer-readable storage medium of claim 17, wherein the operations further comprise:
based on the trajectory, generating control signals to control the vehicle.

20. The non-transitory computer-readable storage medium of claim 17, wherein the operations further comprise:
in response to satisfaction of the safety check, utilizing the coasting behavior to generate the trajectory.

* * * * *